(12) United States Patent
Takahashi

(10) Patent No.: US 8,872,955 B2
(45) Date of Patent: Oct. 28, 2014

(54) DIGITAL PHOTOGRAPHING APPARATUS AND METHOD OF CONTROLLING THE SAME

(75) Inventor: Shinri Takahashi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 849 days.

(21) Appl. No.: 13/014,787

(22) Filed: Jan. 27, 2011

(65) Prior Publication Data

US 2011/0187913 A1 Aug. 4, 2011

(30) Foreign Application Priority Data

Feb. 2, 2010 (KR) .................. 10-2010-0009669

(51) Int. Cl.
*H04N 5/232* (2006.01)
*G03B 17/00* (2006.01)

(52) U.S. Cl.
CPC .............. *G03B 17/00* (2013.01); *H04N 5/232* (2013.01)
USPC .................................................. 348/333.02

(58) Field of Classification Search
CPC ............................... H04N 5/232; G03B 17/00
USPC .......... 348/207.99, 333.01–333.12, 341, 345, 348/240.99; 345/173, 156, 653, 664, 671; 396/296, 297, 373
See application file for complete search history.

(56) References Cited

U.S. PATENT DOCUMENTS

| | | | |
|---|---|---|---|
| 6,144,366 A * | 11/2000 | Numazaki et al. ............ 345/156 |
| 8,384,693 B2 * | 2/2013 | Newton .......................... 345/175 |
| 8,416,209 B2 * | 4/2013 | Hotelling et al. ............. 345/173 |
| 8,429,564 B2 * | 4/2013 | Alexanderovitc et al. .... 715/852 |
| 8,516,397 B2 * | 8/2013 | Frazier et al. ................. 715/863 |
| 8,539,386 B2 * | 9/2013 | Capela et al. ................. 715/863 |
| 8,612,894 B2 * | 12/2013 | Kim .............................. 715/863 |
| 2008/0024454 A1 * | 1/2008 | Everest ......................... 345/173 |
| 2008/0100572 A1 * | 5/2008 | Boillot .......................... 345/158 |
| 2008/0180399 A1 * | 7/2008 | Cheng .......................... 345/173 |
| 2009/0015703 A1 * | 1/2009 | Kim et al. ................ 348/333.12 |
| 2009/0256809 A1 * | 10/2009 | Minor .......................... 345/173 |
| 2009/0303231 A1 * | 12/2009 | Robinet et al. ............... 345/419 |
| 2010/0004029 A1 * | 1/2010 | Kim .............................. 455/566 |
| 2010/0103311 A1 * | 4/2010 | Makii .......................... 348/369 |
| 2011/0012719 A1 * | 1/2011 | Hilger et al. ................. 340/435 |
| 2011/0074822 A1 * | 3/2011 | Chang ......................... 345/649 |
| 2011/0124376 A1 * | 5/2011 | Kim et al. .................... 455/566 |
| 2011/0187913 A1 * | 8/2011 | Takahashi ............... 348/333.02 |
| 2011/0291943 A1 * | 12/2011 | Th+e et al. ................... 345/173 |
| 2011/0291945 A1 * | 12/2011 | Ewing et al. ................. 345/173 |
| 2011/0316976 A1 * | 12/2011 | Nakajima et al. ............. 348/46 |
| 2012/0001944 A1 * | 1/2012 | Sakurai et al. ............... 345/671 |
| 2012/0019528 A1 * | 1/2012 | Ugawa et al. ................ 345/419 |

(Continued)

FOREIGN PATENT DOCUMENTS

JP 10-133818 A 5/1998

*Primary Examiner* — Aung S Moe

(74) *Attorney, Agent, or Firm* — Drinker Biddle & Reath LLP

(57) ABSTRACT

Provided are a digital photographing apparatus including a 3D touch panel through which various manipulation signals of a photographer are input, and a method of controlling the digital photographing apparatus. Accordingly, not only plane coordinates information of an object is determined but also a distance between the object and the digital photographing apparatus is recognized as depth information to thereby control execution of a predetermined operation according to the depth information.

34 Claims, 11 Drawing Sheets

(56) References Cited

U.S. PATENT DOCUMENTS

| | | | |
|---|---|---|---|
| 2012/0113056 A1* | 5/2012 | Koizumi | 345/175 |
| 2012/0120277 A1* | 5/2012 | Tsai | 348/223.1 |
| 2012/0221960 A1* | 8/2012 | Robinson et al. | 715/751 |
| 2012/0307091 A1* | 12/2012 | Yumiki et al. | 348/211.4 |
| 2013/0002548 A1* | 1/2013 | Ueno et al. | 345/158 |
| 2013/0222363 A1* | 8/2013 | Chu et al. | 345/419 |
| 2013/0307827 A1* | 11/2013 | Reisman et al. | 345/175 |
| 2013/0329014 A1* | 12/2013 | Obata | 348/46 |

* cited by examiner

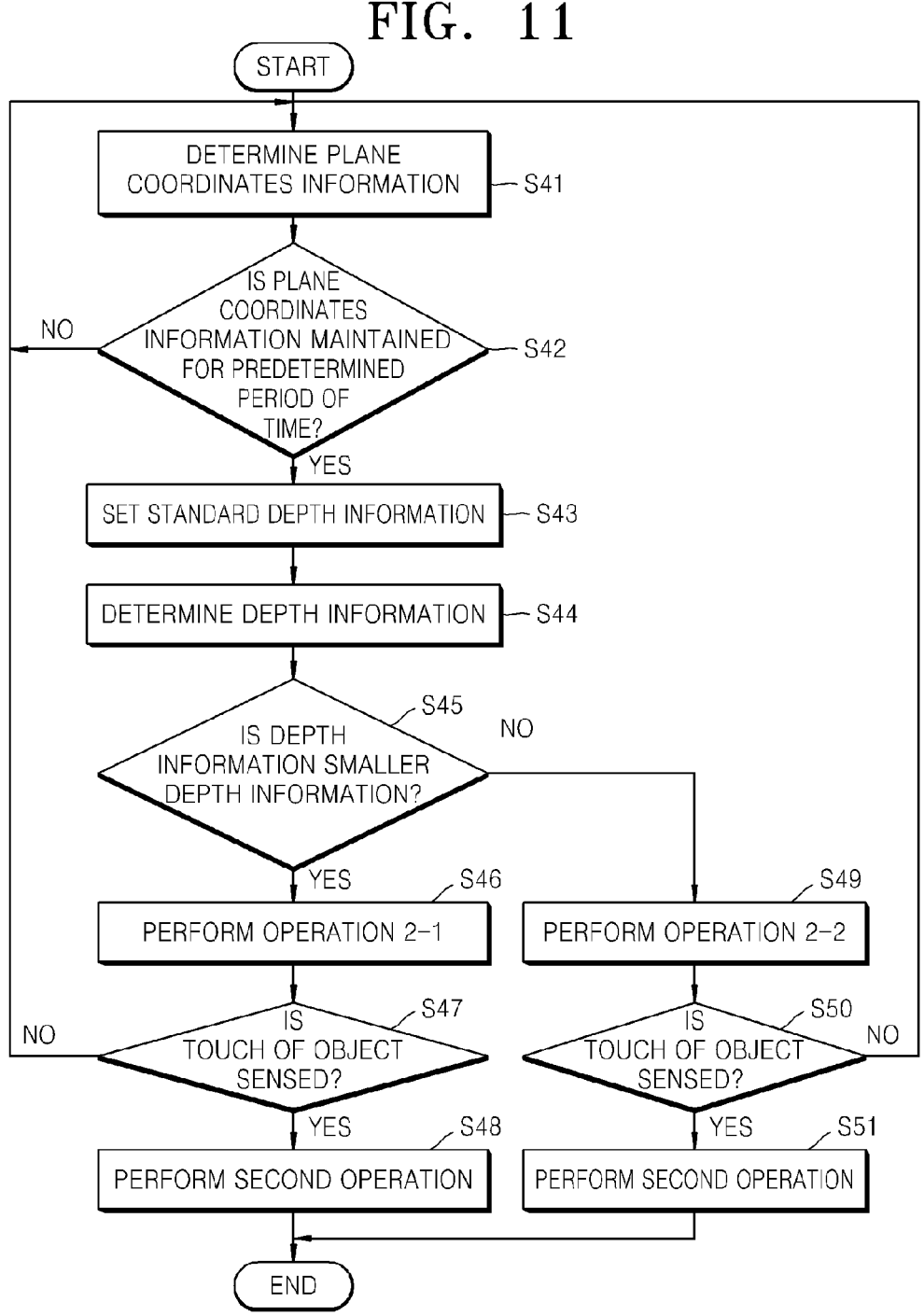

US 8,872,955 B2

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2010-0009669, filed on Feb. 2, 2010, in the Korean Intellectual Property Office, the entire disclosure of which is incorporated herein by reference.

BACKGROUND

1. Field of the Invention

The invention relates to a digital photographing apparatus including a 3D touch panel and a method of controlling the digital photographing apparatus, and computer readable medium with the method recorded thereon.

2. Description of the Related Art

Display units for digital cameras have become larger so that photographers can more easily view live-view images and captured images displayed on the display units. However, the larger space used for the display units limits the space available for controls to control the camera.

To solve this problem, some digital cameras use a touch screen to display both images and camera controls on the touch screen. However, digital cameras provide many functions including auto-focusing (AF), auto-exposure (AE), and auto-white balance (AWB), so displaying the controls (for example as icons on the display unit) for these many functions may obscure the live-view image, which may make it difficult for a photographer to both control the digital camera in preparation of capturing an image and view the live-view image. Similarly, displaying the controls may make it difficult for a photographer to view an image previously captured and control the digital camera to manipulate the previously captured image.

SUMMARY

Therefore, there is a need in the art for a method of controlling a digital photographing apparatus including a 3D touch panel, the method including determining plane coordinate information of an object over the 3D touch panel; designating a subject area corresponding to the determined plane coordinate information of the object of an image input to the digital photographing apparatus; determining depth information of the object over the 3D touch panel; performing a photographing preparation operation with respect to a first image including the subject area, and according to the determined depth information of the object; and capturing a second image including the subject area in relation to which the photographing preparation operation is performed.

The photographing preparation operation may be selected from the group consisting of auto-focusing (AF), auto-exposure (AE), and auto-white balance (AWB).

The method may include sensing a touch of the object on the 3D touch panel, wherein the second image including the subject area in relation to which the photographing preparation operation is captured in response to the sensing of the touch of the object.

When a touch of the object is sensed while the photographing preparation operation is being performed, the second image of the subject area may be captured after completing the photographing preparation operation.

A setup of the digital photographing apparatus may be locked or unlocked according to a result of the photographing preparation operation that is completed according to depth information of the object during a period from when the photographing preparation operation is completed to when a touch of the object is sensed.

When the setup of the digital photographing apparatus is unlocked, a subject area corresponding to plane coordinates information of the object may be designated again in an image input to the digital photographing apparatus.

Depth information of the object corresponds to a relative distance between the object and the 3D touch panel based on depth information of the object may be determined when the subject area is designated.

A method of controlling a digital photographing apparatus including a 3D touch panel is disclosed. The method may including determining plane coordinate information of an object over the 3D touch panel; performing a first operation corresponding to the determined plane coordinate information of the object; determining depth information of the object over the 3D touch panel; and performing a second operation according to the depth information of the object.

The depth information of the object may correspond to a relative distance between the object and the 3D touch panel based on depth information of the object determined based on the determined plane coordinate information of the object.

The method may include displaying a user interface that displays depth information of the object on the 3D touch panel.

The method may include sensing a touch of the object on the 3D touch panel; and performing a third operation corresponding to the sensed touch of the object.

A zooming mode corresponding to the determined plane coordinate information of the object may be started in a live-view mode, and a zooming magnification may be set according to depth information of the object.

A zooming area corresponding to the plane coordinates information of the object may be selected in a playback mode, and a zooming magnification with respect to the zooming area may be set according to depth information of the object that is determined when the zooming mode is started.

A zooming mode corresponding to the plane coordinate information of the object may be started in a live-view mode, and a zooming magnification may be set according to depth information of the object, and an image that is input according to the set zooming magnification that is set to correspond to the sensed touch of the object is picked up.

A method of controlling a digital photographing apparatus including a 3D touch panel is disclosed. The method including determining depth information of an object over the 3D touch panel; performing a first operation corresponding to the depth information of the object; sensing a touch of the object on the 3D touch panel; and performing a second operation according to the sensed touch of the object.

A menu to be set may be selected from among a plurality of menus according to the depth information of the object, and an item corresponding to a touching position of the object may be set among a plurality of items included in the menu that is selected to correspond to the touch of the object.

The method may include determining plane coordinate information of the object on the 3D touch panel; and starting a user setup mode corresponding to the plane coordinate information of the object.

A digital photographing apparatus is disclosed. The digital photographing apparatus including a 3D touch panel configured to determine plane coordinate information and depth information of an object; a subject area setting unit configured to designate a subject area corresponding to the plane coordinates information of the object in an image input to the digital photographing apparatus; a pre-processing control unit configured to perform a photographing preparation operation with respect to a first image of the subject area according to the depth information of the object; and a photographing signal control unit configured to capture a second image of the subject area in relation to which the photographing preparation operation is performed.

The photographing preparation operation may be at least one selected from the group consisting of auto-focusing (AF), auto-exposure (AE), and auto-white balance (AWB).

The 3D touch panel may be configured to sense a touch of the object, and wherein the photographing signal control unit may be configured to capture, after sensing the touch of the object, the second image of the subject area in relation to which the photographing preparation operation is performed.

The photographing signal control unit may be further configured to capture, when the 3D touch panel has sensed a touch of the object while the photographing preparation operation is being performed, the second image of the subject area after completing the photographing preparation operation.

The digital photographing apparatus may include pre-processing setup locking/unlocking unit configured to lock or unlock a setup of the digital photographing apparatus according to a result of the photographing preparation operation that is completed according to depth information of the object during a period from when the photographing preparation operation is completed to when a touch of the object is sensed.

The subject area setting unit may be configured to designate, when the setup of the digital photographing apparatus is unlocked, a subject area corresponding to plane coordinates information of the object again in an image input to the digital photographing apparatus.

Depth information of the object corresponds to a relative distance between the object and the 3D touch panel based on depth information of the object may be determined when the subject area is designated.

A digital photographing apparatus is disclosed. The digital photographing apparatus including a 3D touch panel configured to determine plane coordinates information of an object and depth information of the object; a first operation performing unit configured to perform a first operation corresponding to the plane coordinates information of the object; and a second operation performing unit configured to perform a second operation according to the depth information of the object.

The depth information of the object may correspond to a relative distance between the object and the 3D touch panel based on the depth information determined when the plane coordinates information of the object is determined.

The 3D touch panel may comprise a display unit displaying a user interface that displays depth information of the object.

The digital photographing apparatus may further comprises a third operation performing unit configured to perform a third operation corresponding to the sensed touch of the object, when the 3D touch panel senses a touch of the object.

The first operation performing unit may be configured to start a zooming mode corresponding to the plane coordinates information of the object in a live-view mode, and the second operation performing unit may be configured to set a zooming magnification according to depth information of the object.

The first operation performing unit may be configured to select a zooming area corresponding to the plane coordinates information of the object in a playback mode, and the second operation performing unit may be configured to set a zooming magnification with respect to the zooming area according to depth information of the object.

The first operation performing unit may be configured to start a zooming mode corresponding to plane coordinates information of the object in a live-view mode, and the second operation performing unit may be configured to set a zooming magnification with respect to the zooming area according to depth information of the object determined when the zooming mode is started, and the third operation performing unit may be configured to pick up an image that is input according to the set zooming magnification that is set to correspond to the sensed touch of the object.

A digital photographing apparatus is disclosed. The digital photographing apparatus including a 3D touch panel configured to determine depth information of an object and sensing a touch of the object; first operation performing unit configured to perform a first operation corresponding to the depth information of the object; and a second operation performing unit configured to perform a second operation corresponding to the sensed touch of the object.

The first operation performing unit may be configured to select a menu to be set from among a plurality of menus according to the depth information of the object determined when a user setup mode is started, and the second operation performing unit may be configured to set an item corresponding to a touching position of the object from among a plurality of items included in the menu that is selected to correspond to the touch of the object.

The 3D touch panel may be further configured to determine plane coordinate information of the object, and the digital photographing apparatus may include a third operation performing unit configured to start a user setup mode corresponding to the plane coordinates information of the object.

BRIEF DESCRIPTION OF THE DRAWINGS

The above and other features and advantages of the invention will become more apparent by describing in detail exemplary embodiments thereof with reference to the attached drawings in which:

FIG. 11 is a flowchart illustrating a method of controlling a digital photographing apparatus, according to another embodiment of the invention.

DETAILED DESCRIPTION

A digital photographing apparatus and a method of controlling the digital photographing apparatus according to embodiments of the invention will now be described more fully with reference to the accompanying drawings, in which exemplary embodiments of the invention are shown. However, the digital photographing apparatus may be used in digital appliances, e.g., digital cameras, video cameras, personal digital assistants (PDAs), TVs, digital frames, portable multimedia players (PMPs), or the like.

Figure 1:
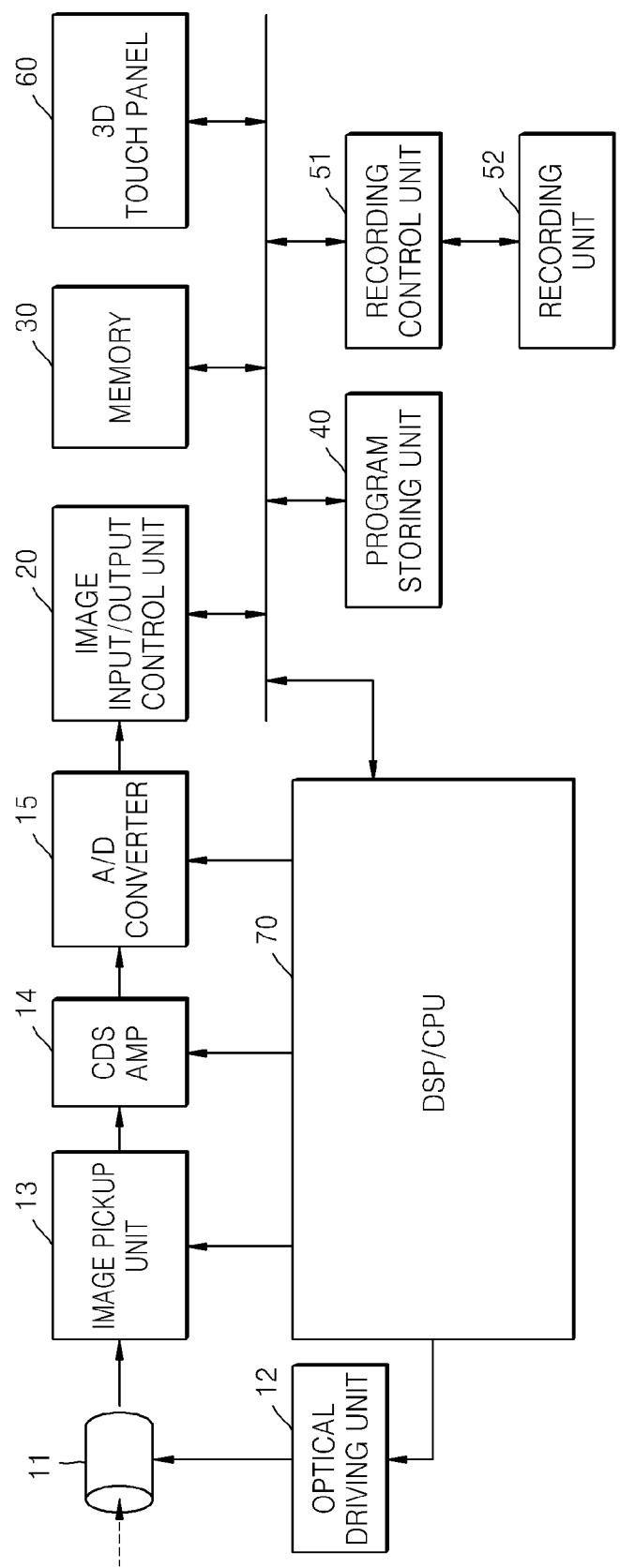
FIG. 1 is a block diagram illustrating a digital photographing apparatus according to an embodiment of the invention.

FIG. 1 is a block diagram illustrating a digital photographing apparatus according to an embodiment of the invention.

Referring to FIG. 1, the digital photographing apparatus includes an optical unit 11, an optical driving unit 12, an image pickup unit 13, a correlated double sampling amplifier (CDS-AMP) 14, an analog to digital (AD) converter 15, an image input/output control unit 20, a memory 30, a program storage unit 40, a recording control unit 52, a recording unit 52, a 3D touch panel 60, and a digital signal processor/central processing unit (DSP/CPU) 70.

The optical unit 11 may include a lens for focusing an optical signal, an aperture for controlling the amount of the optical signal (light amount), and a shutter for controlling input of the optical signal. The lens may include a zoom lens for adjusting an angle of view to be narrow or wide according to a focal length, and/or a focus lens for adjusting a focus of a subject. The lens may be a single lens or a group of lenses. A mechanical shutter over which a cover moves up and down may be used as the shutter. Alternatively, instead of installing a shutter device, the function of a shutter may be carried out by controlling the supply of an electrical signal to the image pickup unit 13.

The optical driving unit 12 which drives the optical unit 11 may adjust the position of the lens, may open or close the aperture, or may operate the shutter in order to perform auto-focusing, automatic exposure control, aperture control, zooming, focusing, and so forth. The optical driving unit 12 receives a control signal from the DSP/CPU 70 to operate the optical unit 11.

The image pickup unit 13 comprises a photoelectric conversion device that receives an optical signal input through the optical unit 11 to convert the optical signal into an electrical signal. Examples of the image pickup unit 13 include a charge-coupled device (CCD) sensor array, a complementary metal-oxide semiconductor (CMOS) sensor array, etc.

The CDS-AMP 14 removes a low frequency noise included in an electrical signal output from the image pickup device 13 and amplifies the electrical signal to a predetermined level at the same time.

The AD converter 15 converts the electrical signal output from the CDS-AMP 14 into a digital signal. The AD converter 15 outputs the generated digital signal to the image input/output control unit 20.

The image pickup unit 13, the CDS-AMP 14, and the AD converter 15 may be controlled according to a timing signal supplied from a timing generator (TG) of the DSP/CPU 70. The TG outputs a timing signal to the image pickup unit 13 to control an exposure time of each pixel of the photoelectric conversion device or reading of charges. Accordingly, the image pickup unit 13 may provide image data corresponding to an image of one frame according to the timing signal provided by the TG.

The memory 30 temporarily stores image data of a captured image. The memory 30 may store image data of a plurality of images, and outputs an image signal by sequentially maintaining image signals when adjusting a focus. Reading or writing image data from/to the image input/output control unit 20 may be controlled. Also, the memory 30 may include an image displaying memory having at least one channel. Input and output of image data from the memory 30 to a display unit of the 3D touch panel 60 may be performed at the same time. A resolution or a maximum number of colors of the display unit depends on the capacity of the image displaying memory.

The program storage unit 40 may store operation systems or application programs that are needed to operate the digital photographing apparatus. Examples of the program storage unit 40 include an electrically erasable programmable read-only memory (E2PROM), a flash memory, and a read only memory (ROM).

The recording control unit 51 controls writing of image data to the recording unit 52 or reading of the image data recorded in the recording unit 52 or setup information. The recording unit 52 may be, for example, an optical disk, e.g., CD, DVD, blue-ray disk, an optical-magnetic disk, a magnetic disk, a semiconductor memory, etc., and writes image data of the captured image. The recording control unit 51 and the recording unit 52 may be detachable from the digital photographing apparatus.

The 3D touch panel 60 includes a touching unit sensing a touch of an object, such as a finger or a conductor, as an input signal of a photographer and a display unit displaying a predetermined image. Also, the 3D touch panel 60 includes a display driving unit that determines a touching position based on a sensing signal from the touching unit and drives the display unit to display an image corresponding to various setup screens or image data generated by photographing. The 3D touch panel 60 will be described in detail later with reference to FIGS. 2 and 3.

The DSP/CPU 70 controls elements mounted in the digital photographing apparatus by using methods. The DSP/CPU 70 outputs a control signal to the optical driving unit 12 based on, for example, focus controlling or exposure controlling, and operates the optical unit 11. The DSP/CPU 70 controls the elements of the digital photographing apparatus according to an input signal of the photographer. According to the current embodiment of the invention, only one DSP/CPU 70 is included; however, various CPUs may also be included such that different CPUs respectively execute commands regarding a signal system and commands regarding an operational system.

The DSP/CPU 70 may reduce noise of input image data and perform image signal processing such as gamma correction, color filter array interpolation, color matrix, color correction, color enhancement, etc. Also, the DSP/CPU 70 receives an image signal that is not compressed yet and compresses the image signal into a format such as a joint photographic experts group (JEPG) format or a Lempel-Ziv-Welch (LZW) format.

A control signal input via the 3D touch panel 60 and an operation of the DSP/CPU 70 according to the control signal will now be described in detail with reference to FIGS. 2 and 3.

Figure 2:
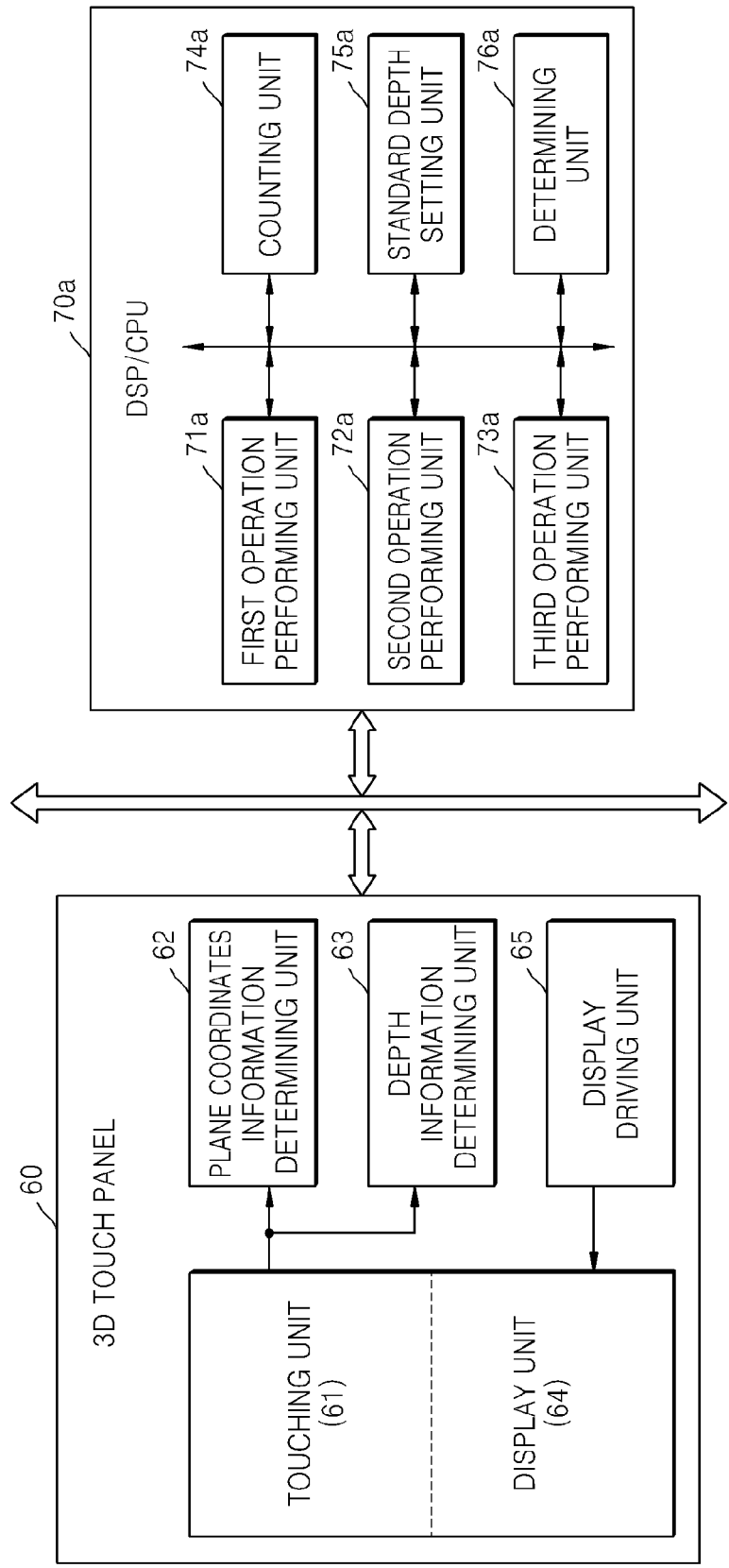
FIG. 2 is a block diagram illustrating a 3D touch panel and a digital signal processor/central processing unit (DSP/CPU) which are elements of the digital photographing apparatus of FIG. 1, according to an embodiment of the invention.

FIG. 2 is a block diagram illustrating the 3D touch panel 60 and a DSP/CPU 70a which are elements of the digital photographing apparatus of FIG. 1, according to an embodiment of the invention.

Referring to FIG. 2, the 3D touch panel 60 includes a touching unit 61 and a display unit 64.

The touching unit 61 may include at least one selected from the group consisting of an electrostatic capacitance touch screen, an infrared ray touch screen, and an electromagnetic resonance (EMR) touch screen. Alternatively, the touching unit 61 may be an optical sensor touch screen that is installed in the display unit 64.

The electrostatic capacitance touch screen determines a touch by measuring electrostatic capacity between an object such as a finger or a conductor and a touch screen sensor and comparing the measurement value with a predetermined value, and calculates a distance between the object and a plane of the touch screen. The electrostatic capacity touch screen includes a sensor unit that is coated with a charge storing material and a driving unit that collects sensing signals sensed through the sensor unit. The sensor unit may be disposed on a surface of the display unit. When the object touches or approaches the sensor unit, predetermined charges are concentrated on a point on a plane of the electrostatic capacitance touch screen being touched or approached by the object. A variation amount of the charges is measured by the driving unit, and whether the object touches or approaches the electrostatic capacitance touch screen and/or a position at which the object touches or approaches the electrostatic capacitance touch screen may be determined based on the variation amount of the charges, which is measured by a position determining unit.

The infrared ray touch screen senses an infrared ray diffusion signal by using an infrared ray receiver that is disposed on an outer portion of the infrared ray touch screen as infrared rays generated from an object such as an infrared ray pen, which are diffused on a surface of the infrared ray touch screen. Then the infrared ray diffusion signal sensed by the position determining unit is compared with a predetermined value to deduce whether the object has touched or approached the infrared ray touch screen and/or a position at which the object touches or approaches the infrared ray touch screen.

The EMR touch screen may sense EMR between an EMR sensor unit and a touch screen stylus pen and measure an approaching degree (distance) of the pen by using the position determining unit based on the sensed EMR.

Also, the optical sensor touch screen may include a touching unit 61 that includes an optical sensor in the display unit 64 such as a liquid crystal display (LCD) or an organic light emitting diode (OLED); the optical sensor picks up an image of an object such as a finger or a touch pen, and the position determining unit analyzes the picked-up image to deduce whether the object has touched or approached the optical sensor touch screen or a position at which the object has touched or approached the optical sensor touch screen. When the image is being enlarged, it may be determined that the object has approached the optical sensor touch screen, and when the image is being reduced, it may be determined that the object has moved away from the optical sensor touch screen.

As described above, the touching unit 61 provides a sensing signal corresponding to whether the object touches or approaches the 3D touch panel 60 and/or a position at which the object touches or approaches the 3D touch panel 60, to the position determining unit in response to whether the object has contacted and/or touched the 3D touch panel 60. Also, the position determining unit may deduce whether the object has touched and/or approached the 3D touch panel 60 and a position at which the object has touched and/or approached the 3D touch panel 60 based on the sensing signal.

According to the current embodiment of the invention, the position determining unit includes a plane coordinates information determining unit 62 and a depth information determining unit 63.

The plane coordinates information determining unit 62 determines position information of the object with respect to a touching surface of the touching unit 61. The depth information determining unit 63 determines depth information about how near the object has approached the touching surface of the touching unit 61. According to the current embodiment, not only depth information of the object when the object has touched the touch surface but also depth information of the object showing how far the object is separated from the touch surface of the touching unit 61 is determined; in other words, the depth information determining unit 63 may be set to deduce plane coordinates information and depth information of an object under a predetermined condition. For example, the plane coordinates information determining unit 62 may deduce plane coordinates information of the object when the object is maintained at a position for a predetermined period of time. Also, the depth information determining unit 63 may deduce depth information of the object at the position for a predetermined period of time a predetermined period of time. The depth information may correspond to a relative distance between the object and the 3D touch panel 60 based on the depth information of the object at a point of time when the plane coordinates information of the object is sensed.

The 3D touch panel 60 includes a display driving unit 65 that provides image data and synchronization signals to the display unit 64 so as to display predetermined images. The display unit 64 may be an LCD, an OLED, a light emitting diode (LED), a plasma display panel (PDP), or the like. The display driving unit 65 may include a driver integrated circuit (IC) that is appropriate for each display panel.

For example, the DSP/CPU 70a that controls in connection with the 3D touch panel 60 may include a first operation performing unit 71a, a second operation performing unit 72a, a counting unit 74a, a standard depth setting unit 75a, and a determining unit 76a.

The first operation performing unit 71a may perform a first operation corresponding to plane coordinates information that is determined using the plane coordinates information determining unit 62. For example, when a user interface (UI) corresponding to the plane coordinates information is displayed on the display unit 64 and an object is disposed above the UI, the first operation performing unit 71a may recognize selection of the UI, and the first operation performing unit 71a may perform a predetermined first operation related to the UI.

The second operation performing unit 72a may perform a second operation corresponding to depth information of the object determined using the depth information determining unit 63. As in the above-described embodiment, a second operation may be performed as an object approaches, moves away from, or touches a predetermined area of the display unit 61 with the plane coordinates information. That is, the second operation may be performed according to the depth information of the object. While the first operation is execution of an operation in a predetermined mode, the second operation may be selection of a variable regarding the predetermined mode. Thus, a predetermined mode corresponding to the plane coordinates information may be selected in the digital photographing apparatus, and a variable corresponding to the recognized depth information may be set in the predetermined mode.

Images, sounds, vibrations, or the like corresponding to the depth information may be provided as feedback. For example, when the object has approached the touching unit 61, the UI may be displayed having a first color, and when the object has moved away from the touching unit 61, the UI may be displayed having a second color, and when the object has touched the touching unit 61, the UI may be displayed having a third color. Alternatively, a louder or quieter sound may be output or an intensity of vibration may be increased or reduced according to the depth information.

The counting unit 74a determines whether the plane coordinates information that is provided in real-time by the plane coordinates information determining unit 62 remains unchanged for a predetermined period of time.

When the plane coordinates information determining unit 62 remains unchanged for a predetermined period of time, the standard depth setting unit 75a sets the depth information of the object as standard depth information.

The determining unit 76a compares the depth information determined using the depth information determining unit 63 with the set standard depth information.

According to a result of the comparison, the second operation performing unit 72a may set a corresponding variable.

For example, the first operation performing unit 71a may perform a first operation in which a zooming mode corresponding to the plane coordinates information of the object is selected and started in a live-view mode, and the second operation performing unit 72a may perform an operation in which a zooming magnification is set according to depth information of the object. When the object is disposed above the UI through which a zooming mode is selected, the first operation of selecting a zooming mode may be performed; when the object approaches the UI on the 3D touch panel based on the depth information as the zooming mode is selected, a tele move operation may be performed, and when the object moves away from the UI on the 3D touch panel, a wide move operation may be performed.

According to another embodiment of the invention, the first operation performing unit 71a may perform a first operation in which a zooming area corresponding to the plane coordinates information of the object is selected in a playback mode, and the second operation performing unit 72a may perform an operation in which a zooming magnification with respect to the zooming area is set as the variable according to depth information of the object.

Also, the DSP/CPU 70a may further include a third operation performing unit 73a. A touch of the object is determined using the determining unit 76a based on the depth information, and a third operation corresponding to the touch of the object may be performed.

For example, the first operation performing unit 71a may perform a first operation in which a zooming mode corresponding to the plane coordinates information of the object is selected and started in a live-view mode, and the second operation performing unit 72a may perform an operation in which a zooming magnification is set according to depth information of the object, and the third operation performing unit 73a may perform an operation in which an image that is input according to the zooming magnification that is set in response to the sensed touch of the object is picked up. The picked image may be compressed and stored in a recording medium.

According to another embodiment of the invention, the DSP/CPU 70a which controls a system in connection to the 3D touch panel 60 may include a first operation performing unit 71a, a second operation performing unit 72a, a counting unit 74a, a standard depth setting unit 75a, and a determining unit 76a.

The first operation performing unit 71a may perform a first operation according to depth information of the object. Before performing the first operation, the counting unit 74a determines whether plane coordinates information of the object provided by the plane coordinates information determining unit 62 in real-time remains unchanged for a predetermined period of time. When the plane coordinates information provided in real-time remains unchanged for a predetermined period of time, the standard depth setting unit 75a sets depth information of the object as standard depth information. The determining unit 76a compares the depth information determined using the depth information determining unit 63 with the set standard depth information. The first operation performing unit 71a may perform a first operation according to a result of the comparison of the determined depth information of the object and the standard depth information.

Also, the second operation performing unit 72a may perform a second operation in response to a sensed touch of the object. The touch of the object may be further determined by using the determining unit 76a according to the depth information provided by the depth information determining unit 63.

For example, the first operation performing unit 71a may perform a first operation in which a menu to be set among a plurality of menus is selected according to depth information of the object, and the second operation performing unit 72a may perform a second operation in which an item corresponding to a touching position of the object among a plurality of items included in the menu that is selected corresponding to the touch of the object.

The DSP/CPU 70a may further include a third operation performing unit 73a that performs an operation corresponding to plane coordinates information of the object when setting the standard depth.

For example, the third operation performing unit 73a may perform a third operation in which a user setting mode corresponding to plane coordinates information of the object is started.

Figure 3:
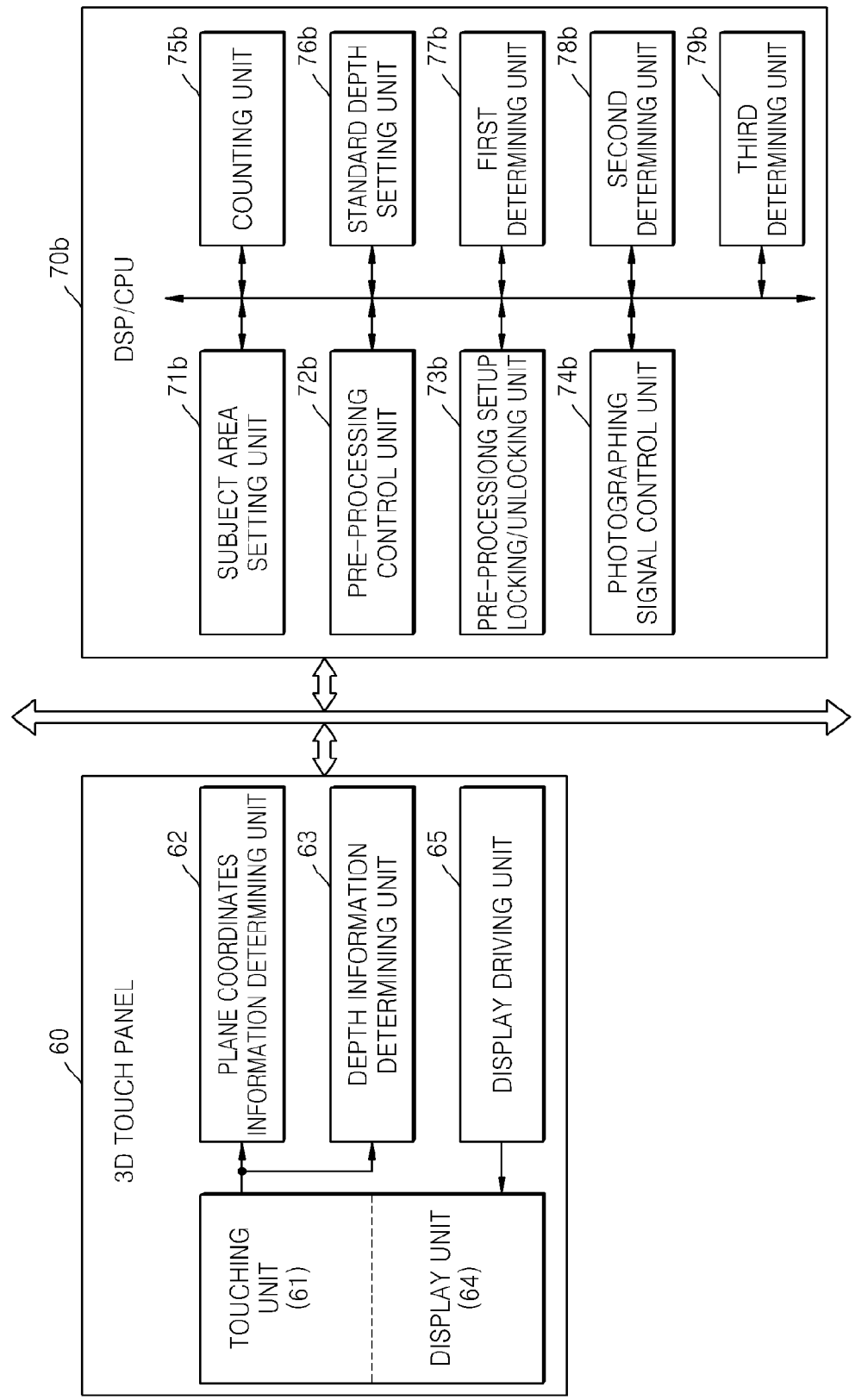
FIG. 3 is a block diagram illustrating a 3D touch panel and a DSP/CPU which are elements of the digital photographing apparatus of FIG. 1, according to another embodiment of the invention.

FIG. 3 is a block diagram illustrating the 3D touch panel 60 and a DSP/CPU 70b which are elements of the digital photographing apparatus of FIG. 1, according to another embodiment of the invention.

Referring to FIG. 3, the 3D touch panel 60 may include a plane coordinate information determining unit 62, a depth information determining unit 63, a display unit 64, and a display driving unit 65. The 3D touch panel 60 is the same as the 3D touch panel 60 of FIG. 2 and thus a detailed description thereof will not be repeated.

The DSP/CPU 70b according to the current embodiment of the invention includes a subject area setting unit 71b designating a subject area corresponding to plane coordinates information provided from the plane coordinates information determining unit 62, a pre-processing control unit 72b performing photographing preparation as a pre-processing operation before capturing a first image of the subject area according to depth information of the object, and a photographing signal control unit 74b capturing a second image of the subject area to which the photographing preparation is performed.

The photographing preparation may be at least one of auto-focusing (AF), auto-exposure (AE), and auto-white balance (AWB).

Also, the DSP/CPU 70b may include a counting unit 75b that determines whether plane coordinates information provided in real-time using the plane coordinates information determining unit 62 remains unchanged for a predetermined period of time, and a standard depth setting unit 76b that sets depth information of the object when the plane coordinates information remains unchanged for a predetermined period of time, as standard depth information. Also, the DSP/CPU 70b may further include a first determining unit 77b that compares the depth information with the standard depth information, a second determining unit 78b that determines completion of a second operation when a second operation is executed, and a third determining unit 79b that determines a touch of the object.

According to a result of the determination by the first determining unit 77b, the second operation may be performed. Also, when the second operation is completed according to results of the determination by the second determining unit 78b and the third determining unit 79b, and if a touch of the object is sensed, a third operation is performed. Also, if a touch of the object is sensed even when the second operation is not completed, the second operation is completed and then the third operation may be performed.

In detail, a live-view image that is input in real-time is displayed on the display unit 64. When the object is disposed above a portion of the touching unit 61, the plane coordinates information determining unit 62 determines plane coordinates of the object. In the touching unit 61, a touch screen is formed in the display unit 64, and thus a position of the object above the touching unit 61 corresponds to a position of the object above the display unit 64, and furthermore denotes that the object is disposed above the live-view image displayed on the display unit 64. The counting unit 75b determines whether the determined plane coordinates remains unchanged for a predetermined period of time. A subject area corresponding to the plane coordinates remains unchanged for a predetermined period of time may be designated in the live-view image. The standard depth setting unit 76b may set depth information of the object when designating a subject area as standard depth information. Thereafter, depth information is provided in real-time as the object moves. The first determining 77b compares the depth information with the standard depth information, and according to a result of the comparison by the first determining unit 77b, the pre-processing control unit 72b may perform photographing preparation in relation to the live-view image as a pre-processing operation before capturing an image. For example, the subject area of the live-view image may be set as an auto-focusing area, and an auto-focusing operation may be performed as a pre-processing operation with respect to an image of the auto-focusing area. In detail, when the object approaches the touching unit 61, that is, if the depth information of the object is smaller than the standard depth information, the auto-focusing operation may be performed. Also, when a touch of the object is sensed after completing the auto-focusing operation according to a result of the determination by the second determining unit 78b and the third determining unit 79b, the photographing signal control unit 74b may control such that the auto-focusing operation is completed and then a second image is captured. However, if a touch of the object is sensed even though the auto-focusing operation is not completed, the photographing signal control unit 74b may control so as to capture the second image after completing the auto-focusing operation.

The DSP/CPU 70b may include a pre-processing setup locking/unlocking unit 73b that locks or unlocks a setup of the digital photographing apparatus according to a result of the photographing preparation that is completed according to depth information of the object during a period from when the photographing preparation operation is completed to when a touch of the object is sensed.

Figure 4:
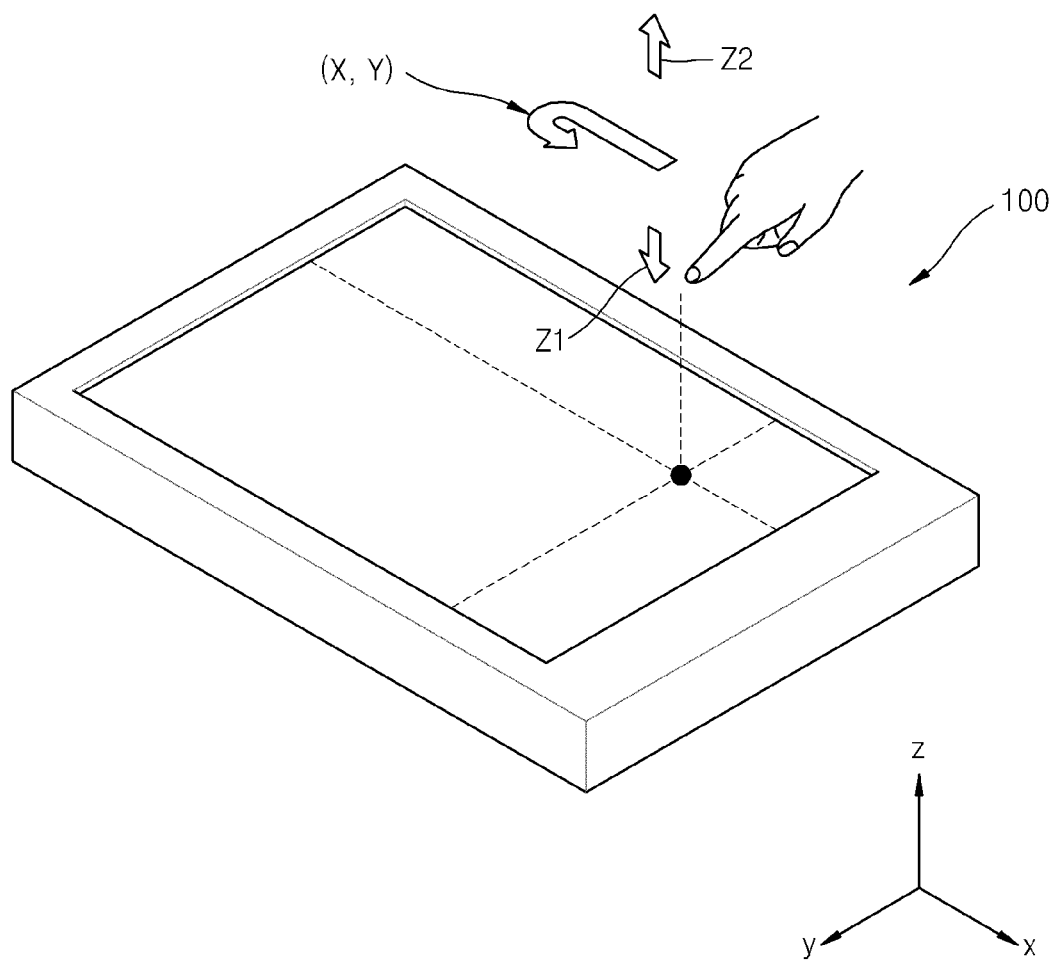
FIG. 4 is a schematic view for explaining recognition of a touch in a digital photographing apparatus, according to an embodiment of the invention.

FIG. 4 is a schematic view for explaining recognition of a touch in a digital photographing apparatus 100 according to an embodiment of the invention.

Referring to FIG. 4, when the user disposes a finger, which is an example of an object, above a touching unit of the digital photographing apparatus 100 and maintains the finger there for a predetermined period of time, coordinates information (x, y) of the finger may be determined. Depth information of the object when determining the coordinates information (x, y) is set as standard depth information, and various input signals to the digital photographing apparatus 100 may be generated based on whether the object approaches (Z1) or moves away (Z2) from the touching unit.

Figure 5:
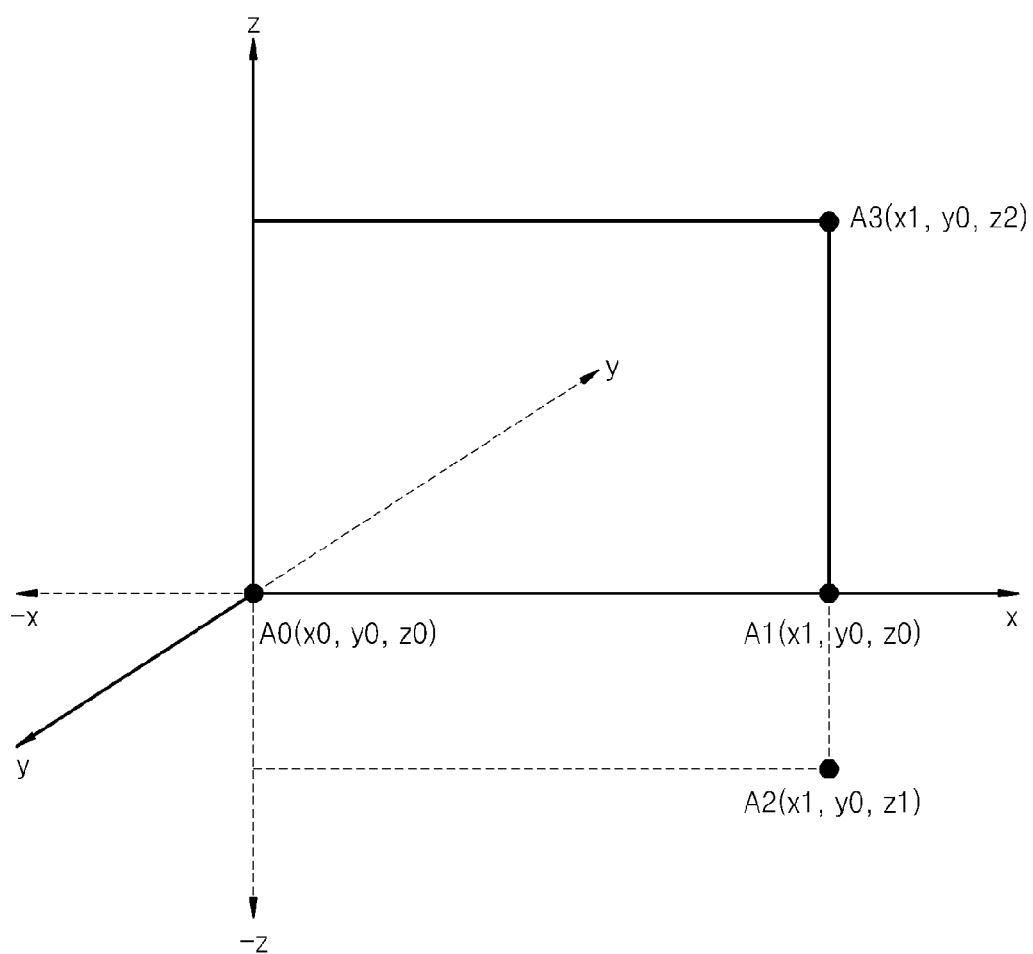
FIG. 5 is a schematic view for explaining recognition of depth information of an object in a digital photographing apparatus, according to an embodiment of the invention.

FIG. 5 is a schematic view for explaining recognition of depth information of an object in a digital photographing apparatus according to an embodiment of the invention.

Referring to FIG. 5, above a touching unit of the digital photographing apparatus, the object is initially arranged at a first position A0 (X0, Y0, Z0), and is moved to a portion above a desired UI that is displayed on the display unit. For example, the object may be moved a distance x1 and arranged at a second position A1 (X1, Y0, Z0). When the object stays at the second position for a predetermined period of time, a coordinate 0 on a z-axis may be set as standard depth information. The object may move toward the touching unit from the second position and be arranged at a third position A2 (X1, Y0, Z1) to perform an operation corresponding to the third position A2 (X1, Y0, Z1) or the object may move away from the position z0 and be arranged at a fourth position A3 (X1, Y0, Z2) to perform an operation corresponding to the fourth position A3 (X1, Y0, Z2).

For example, when the object is positioned at A1, a subject area corresponding to the position A1 is set as an auto-focusing area. When the object approaches the touching unit from the position A1, an auto-focusing operation is performed with respect to the auto-focusing area, and when a focus lens is moved according to the auto-focusing operation, and then when the object touches the touching unit, an image is picked up. When a touch of the object is not sensed after moving the focus lens, a setup according to the auto-focusing operation, that is, the position of the moved focus lens is locked. If photographing is not desired at that point of time and a new auto-focusing operation is to be performed, the object is separated from the standard depth information and moved to A3, thereby unlocking the locked position of the focus lens.

Figure 6:
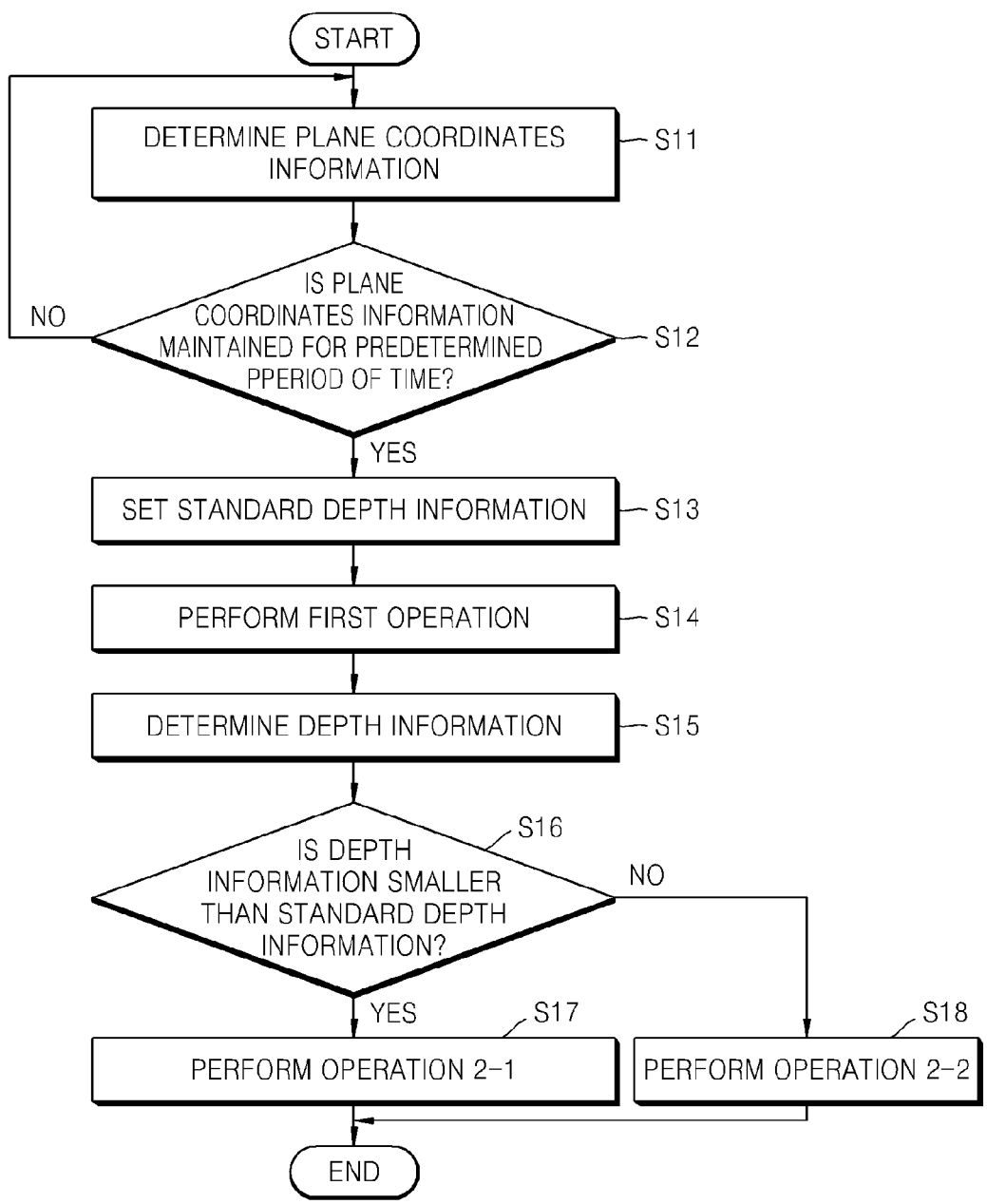
FIG. 6 is a flowchart illustrating a method of controlling a digital photographing apparatus, according to an embodiment of the invention.

FIG. 6 is a flowchart illustrating a method of controlling a digital photographing apparatus according to an embodiment of the invention.

Referring to FIG. 6, in operation S11, when an object is disposed above a touching unit, plane coordinates information of the object is determined in real-time.

In operation S12, whether the determined plane coordinates information remains unchanged for a predetermined period of time is determined.

In operation S13, when the determined plane coordinates information remains unchanged for a predetermined period of time, depth information of the object is set as standard depth information. If the determined plane coordinates information does not remain unchanged for a predetermined period of time, plane coordinates information of the object is determined again in operation S11.

In operation S14, a first operation corresponding to the plane coordinates information that remains unchanged for a predetermined period of time is performed. Operations S14 and S13 may be performed at the same time or the order of performing thereof may be changed.

In operation S15, depth information that is input in real-time is determined.

In operation S16, the determined depth information and the standard depth information are compared.

If the depth information is smaller than the standard depth information, an operation 2-1 may be performed in operation S17, and if the depth information is greater than the standard depth information, an operation 2-2 may be performed in operation S18.

Figure 7:
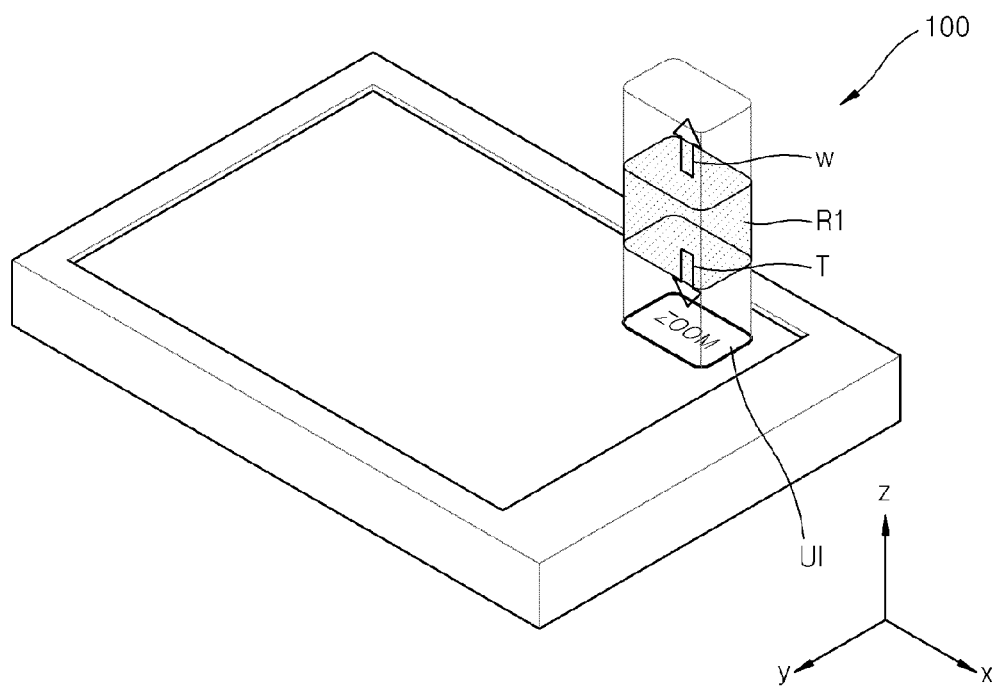
FIG. 7 is a schematic view for explaining execution of a zooming operation in a photographing mode that is performed by recognizing depth information of an object in a digital photographing apparatus, according to an embodiment of the invention.

Exemplary embodiments according to FIG. 6 will be described with reference to FIGS. 7 and 8. FIG. 7 is a schematic view for explaining execution of a zooming operation in a photographing mode that is performed by recognizing depth information of an object in a digital photographing apparatus, according to an embodiment of the invention, and FIG. 8 is a schematic view for explaining a zooming operation performed in a playback mode that is performed by recognizing depth information of the object in a digital photographing apparatus, according to an embodiment of the invention.

Referring to FIG. 7, a live-view image that is input in real-time in a live-view mode of the digital photographing apparatus 100 is displayed on a display unit. The photographer checks the live-view image, and may select a zooming mode for extension or reduction of the live-view image if desired. Here, the object is arranged above a UI "ZOOM" which corresponds to the zooming mode. Plane coordinates information of the object corresponds to plane coordinates information of the display unit. When the plane coordinates information of the object remains unchanged for (a predetermined period of time) a zooming mode is selected and started. Also, depth information of the object is determined when the plane coordinates information remains unchanged for a predetermined period of time. The depth information is set as standard depth information R1. When the object approaches the touching unit with the above plane coordinates information, that is, when the object is moved so as to have smaller depth information than the standard depth information, the lens is driven in the zooming mode to perform a tele (T) zooming operation. When the object moves away from the touching unit with the above plane coordinates information, that is, when the object is moved so as to have greater depth information than the standard depth information, a wide (W) zooming operation is performed in the zooming mode.

Figure 8:
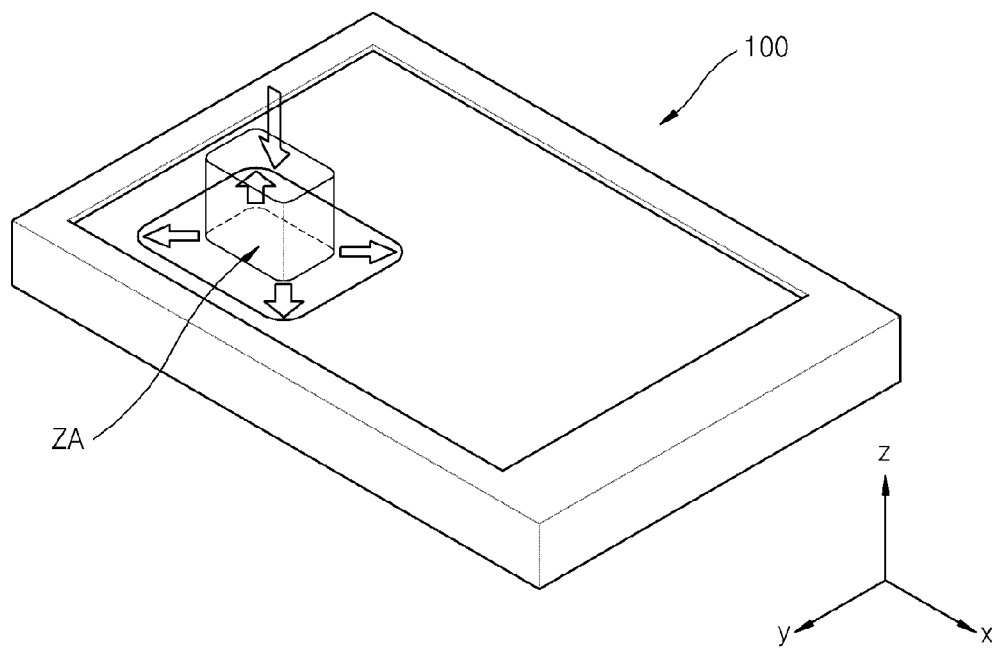
FIG. 8 is a schematic view for explaining a zooming operation performed in a playback mode that is performed by recognizing depth information of an object in a digital photographing apparatus, according to an embodiment of the invention.

According to another embodiment of the invention, referring to FIG. 8, an image that is previously stored in a playback mode of the digital photographing apparatus 100 is displayed on the display unit. The photographer may select a portion ZA to enlarge or reduce in the displayed image. The object is disposed above the portion ZA of the image and remains unchanged for a predetermined period of time. Plane coordinates information of a position of the object above the portion of the image is determined, and when the plane coordinates information remains unchanged for a predetermined period of time, the portion ZA with the above plane coordinates information may be determined as a portion to be enlarged or reduced. By disposing the object near to the touching unit so that the object has the above plane coordinates information and smaller depth information than the standard depth information, the portion ZA may be enlarged.

Figure 9:
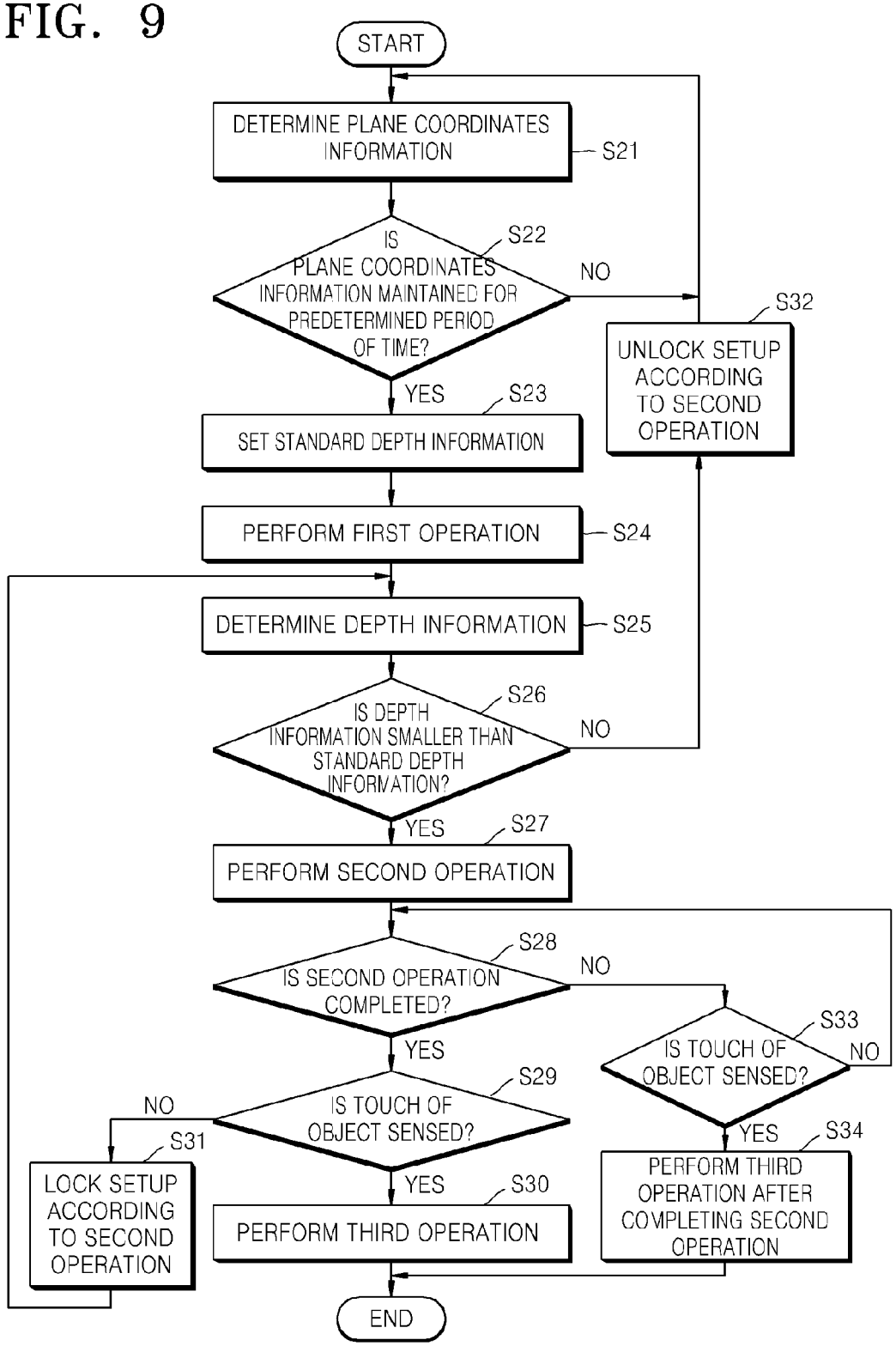
FIG. 9 is a flowchart illustrating a method of controlling a digital photographing apparatus, according to another embodiment of the invention.

FIG. 9 is a flowchart illustrating a method of controlling a digital photographing apparatus according to another embodiment of the invention.

Referring to FIG. 9, in operation S21, when an object is arranged above a touching unit, plane coordinates information of the object is determined in real-time.

In operation S22, whether the determined plane coordinates information of the object remains unchanged for a predetermined period of time is determined. In operation S23, when the determined plane coordinates information of the object remains unchanged for a predetermined period of time, depth information at this point of time is set as standard depth information. If the plane coordinates information of the object does not remain unchanged for a predetermined period of time, it means that the object is moving, and the plane coordinates information of the object is determined again in operation S21.

In operation S24, a first operation corresponding to the plane coordinates information of the object that remains unchanged for a predetermined period of time is performed.

In operation S25, the depth information of the object is determined in real-time.

In operation S26, the determined depth information of the object is compared with the standard depth information.

In operation S27, if the depth information of the object is smaller than the standard depth information, a second operation is performed.

In operation S28, whether the second operation is completed is determined. In operation S29, when the second operation is completed, whether a touch of the object is sensed is determined. When a touch of the object is sensed, a third operation is performed in operation S30. In operation S31, if a touch from the object is not sensed, a setup according to the second operation is locked. Then the depth information of the object is determined in real-time again in operation S25. In embodiments, the method may return to S21 after the second operation is locked.

When the second operation is not completed, a touch of the object is sensed after the second operation is completed in operation S33. If a touch of the object is not sensed, whether the second operation is completed is determined again in operation S28. In operation S34, when a touch of the object is sensed, a third operation is performed after completing the second operation.

Figure 10:
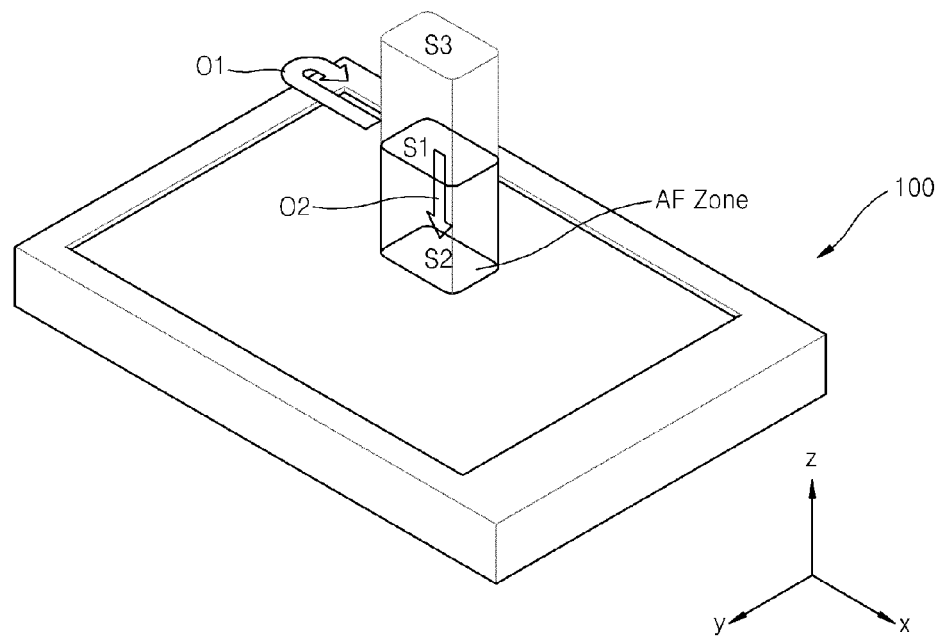
FIG. 10 is a schematic view for explaining execution of an auto-focusing operation that is performed by recognizing depth information of an object in a digital photographing apparatus, according to an embodiment of the invention.

FIG. 10 is a schematic view for explaining an example of a method of controlling a digital photographing apparatus 100 described with reference to FIG. 9, according to an embodiment of the invention, that is, execution of an auto-focusing operation that is performed by recognizing depth information of an object in the digital photographing apparatus.

Referring to FIG. 10, an object is moved along a X-Y plane (O1) in a live-view mode of the digital photographing apparatus 100 to set an auto-focusing (AF) zone. The object is disposed above a desired subject area and remains unchanged for a predetermined period of time. Accordingly, the AF zone may be set. Depth information of the object when setting the AF zone is set as standard depth information. Also, the digital photographing apparatus 100 is controlled to perform an auto-focusing operation by adjusting depth information of the object with the plane coordinates information of the AF zone.

When the object approaches near the touching unit (O2), the depth information of the object is smaller than the standard depth information, thereby performing an auto-focusing operation. When the object touches the digital photographing apparatus 100 after performing the auto-focusing operation, the digital photographing apparatus 100 may be controlled so as to pick up an image to which the auto-focusing operation is performed. When the object does not touch the digital photographing apparatus 100 after completing the auto-focusing operation, a setup according to the auto-focusing operation (the moved position of the focus lens) may be locked. However, when the object has moved away from the digital photographing apparatus 100 beyond a range of the standard depth information or greater, the locked setup according to the auto-focusing operation may be unlocked. Also, the plane coordinates information of the object may be sensed in real-time.

According to the current embodiment of the invention, a time lag from when a signal input by the photographer is received to when an image is picked up is reduced, thereby reducing stress the photographer may experience with respect to a photographing operation.

FIG. 11 is a flowchart illustrating a method of controlling a digital photographing apparatus according to another embodiment of the invention.

Referring to FIG. 11, in operation S41, plane coordinates information of an object is determined.

In operation S42, whether the plane coordinates information of the object remains unchanged for a predetermined period of time is determined.

If the plane coordinates information of the object does not remain unchanged for a predetermined period of time, plane coordinates information of the object is determined again.

In operation S44, when the plane coordinates information of the object remains unchanged for a predetermined period of time, depth information at this point of time is set as standard depth information.

In operation S45, the determined depth information is compared with the standard depth information.

In operation S46, if the depth information of the object is smaller than the standard depth information, an operation 1-1 is performed.

In operation S47, a touch of the object is sensed.

In operation S48, if a touch of the object is sensed, a second operation is performed. If a touch of the object is not sensed, plane coordinates information of the object is determined again in operation S41.

In operation S49, if the depth information of the object is greater than the standard depth information, an operation 1-2 is performed.

In operation S50, a touch of the object is sensed.

In operation S51, when a touch of the object is sensed, a second operation is performed. If a touch of the object is not sensed, plane coordinates information of the object is determined again in operation S41.

Figure 12A:
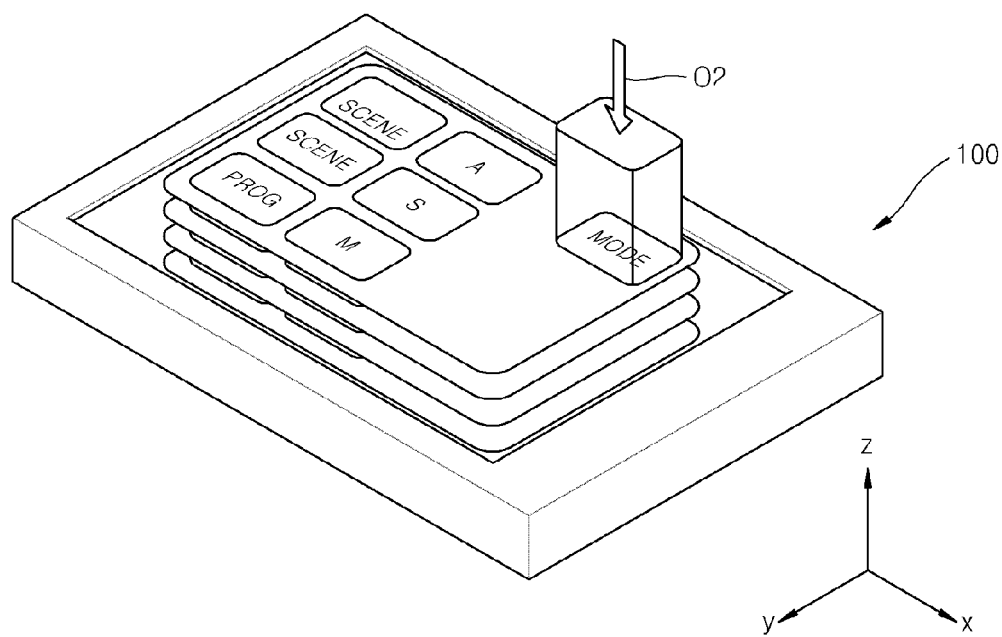
FIGS. 12A and 12B are schematic views for explaining operations executed in a user setup mode that is performed by recognizing depth information of an object in a digital photographing apparatus, according to an embodiment of the invention.
Figure 12B:
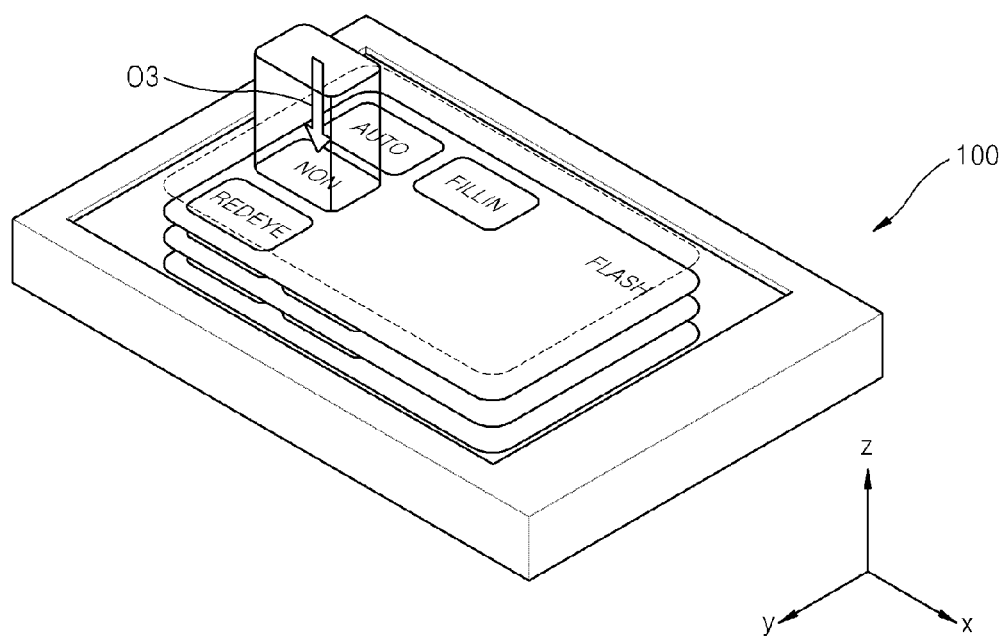

Exemplary embodiments according to FIG. 11 will be described with reference to FIGS. 12A and 12B. FIGS. 12A and 12B are schematic views for explaining operations executed in a user setup mode that is performed by recognizing depth information of an object in a digital photographing apparatus according to an embodiment of the invention.

Referring to FIG. 12A, operations are executed in a user setup mode. For example, to set "MODE," the object is arranged above an icon "MODE" for setting "MODE." Here, plane coordinates information of the object is determined and whether the plane coordinates of the object remains unchanged for a predetermined period of time is determined.

When the plane coordinates of the object remains unchanged for a predetermined period of time, that is, when the object stays above the icon "MODE" a predetermined period of time, standard depth information is set. When the object approaches the digital photographing apparatus based on the standard depth information (O2), the object may move to a next menu after "MODE" (this corresponds to the operation 1-1 of FIG. 11).

As shown in FIG. 12B, a flash operation in a "FLASH" mode which is a next setup menu after "MODE" may be executed. When the object moves away from the digital photographing apparatus in FIG. 12B, the user setup mode may be switched to a previous setup menu before "MODE" (this corresponds to the operation 1-2 of FIG. 11).

Referring to FIG. 12B again, when the photographer wants to set a variable from among a plurality of variables in a "FLASH" mode, an icon through which a photographer control signal may be input (O3) to perform a setup of a corresponding variable is touched. If the photographer does not select a "FLASH" mode, an icon "NON" corresponding thereto is touched. Accordingly, an operation in a "FLASH OFF" mode may be performed (this corresponds to the second operation in FIG. 11).

Embodiments of the invention have the advantage that in performing operations such as auto-focusing (AF), auto-exposure (AE), and auto-white balance (AWB) may be controlled before picking up an image and a desired image may be captured by a touch by the photographer, thereby reducing a time lag during a period from when a signal input by the photographer is received to when an image is captured.

The above-described method of controlling a digital photographing apparatus according to embodiments of the invention can be written as computer readable codes on a computer readable recording medium. Examples of the computer readable recording medium include all kinds of recording devices in which computer readable data is stored.

The computer readable recording medium is any data storage device that can store data which can be thereafter read by a computer system. The computer readable recording medium may be limited to non-transitory computer readable recording medium. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, code, and code segments for accomplishing the invention can be easily construed by programmers of ordinary skill in the art to which the invention pertains.

According to the invention, since not only a plane position of an object but also a space position of the object are recognized, various manipulation signals of the photographer may be input to the digital photographing apparatus.

Also, according to the invention, pre-processing operations such as auto-focusing (AF), auto-exposure (AE), or auto-white balance (AWB) are controlled before picking up an image based on a variation in the touching positions of the object in the space, and then the 3D touch panel is touched when desired by the photographer to photograph an image, thereby easily adjusting a photographing time as the photographer desires. According to the conventional art, when the photographer touches the touch panel to pick up an image after the pre-processing operations such as AF, AE, and AWB are performed, an image to which the pre-processing operation is performed may not be one that is desired by the photographer, or a time interval from when a signal is input by the photographer to when an image is picked up may be too long for the photographer to capture a desired image. However, according to the invention, these problems can be prevented.

The functionality associated with describing embodiments of the invention is described with a number of illustrative units. However, the units may be differently arranged so that the functionality of a single unit may be implemented with two or more units and the functionality of two or more units may be combined into a single unit. Moreover, the functionality may be differently arranged between illustrative units.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the invention.

What is claimed is:

1. A method of controlling a digital photographing apparatus including a 3D touch panel, the method comprising:
   determining plane coordinate information of an object over the 3D touch panel;
   designating a subject area corresponding to the determined plane coordinate information of the object of an image input to the digital photographing apparatus;
   determining depth information of the object over the 3D touch panel;
   performing a photographing preparation operation with respect to a first image including the subject area, and according to the determined depth information of the object; and
   capturing a second image including the subject area in relation to which the photographing preparation operation is performed.

2. The method of claim 1, wherein the photographing preparation operation is at least one selected from the group consisting of auto-focusing (AF), auto-exposure (AE), and auto-white balance (AWB).

3. The method of claim 1, further comprising:
   sensing a touch of the object on the 3D touch panel, wherein the second image including the subject area in relation to which the photographing preparation operation is captured in response to the sensing of the touch of the object.

4. The method of claim 3, wherein when a touch of the object is sensed while the photographing preparation operation is being performed, the second image of the subject area is captured after completing the photographing preparation operation.

5. The method of claim 3, wherein a setup of the digital photographing apparatus is locked or unlocked according to a result of the photographing preparation operation that is completed according to depth information of the object during a period from when the photographing preparation operation is completed to when a touch of the object is sensed.

6. The method of claim 5, wherein when the setup of the digital photographing apparatus is unlocked, a subject area corresponding to plane coordinate information of the object is designated again in an image input to the digital photographing apparatus.

7. The method of claim 1, wherein depth information of the object corresponds to a relative distance between the object and the 3D touch panel based on depth information of the object determined when the subject area is designated.

8. A method of controlling a digital photographing apparatus including a 3D touch panel, the method comprising:
   receiving input from the 3D touch panel that has a display and an optical sensor that determines whether an object has touched or approached the 3D touch panel;
   determining plane coordinate information of the object over the 3D touch panel based on information determined by the optical sensor;
   setting, according to the plane coordination information, a zooming mode in a live-view mode, or a zooming area in a playback mode;
   performing a first operation corresponding to the determined plane coordinate information of the object;
   determining depth information of the object over the 3D touch panel based on information determined by the optical sensor,
   setting, in the live-view mode or in the playback mode, a zooming magnification according to the depth information of the object; and
   performing a second operation according to the depth information of the object.

9. The method of claim 8, wherein the depth information of the object corresponds to a relative distance between the object and the 3D touch panel based on depth information of the object determined based on the determined plane coordinate information of the object.

10. The method of claim 9, further comprising:
displaying a user interface that displays depth information of the object on the 3D touch panel.

11. The method of claim 8, further comprising:
sensing a touch of the object on the 3D touch panel; and
performing a third operation corresponding to the sensed touch of the object.

12. The method of claim 8, wherein the zooming mode corresponding to the determined plane coordinate information of the object is started in the live-view mode, and the zooming magnification is set according to the depth information of the object.

13. The method of claim 8, wherein the zooming area corresponding to the plane coordinate information of the object is selected in the playback mode, and the zooming magnification with respect to the zooming area is set according to the depth information of the object that is determined when the zooming mode is started.

14. The method of claim 11, wherein the zooming mode corresponding to the plane coordinate information of the object is started in the live-view mode, and the zooming magnification is set according to the depth information of the object, and an image that is input according to the set zooming magnification that is set to correspond to the sensed touch of the object is picked up.

15. A method of controlling a digital photographing apparatus including a 3D touch panel, the method comprising:
receiving input from a 3D touch panel that has a display and an optical sensor that determines whether an object has touched or approached the 3D touch panel;
determining plane coordinate information of the object over the 3D touch panel based on information determined by the optical sensor;
setting, according to the plane coordination information, a zooming mode in a live-view mode, or a zooming area in a playback mode;
determining depth information of an object over the 3D touch panel based on information determined by the optical sensor;
setting, in the live-view mode or in the playback mode, a zooming magnification according to the depth information of the object;
performing a first operation corresponding to the depth information of the object;
sensing a touch of the object on the 3D touch panel; and
performing a second operation according to the sensed touch of the object.

16. The method of claim 15, wherein a menu to be set is selected from among a plurality of menus according to the depth information of the object, and an item corresponding to a touching position of the object is set among a plurality of items included in the menu that is selected to correspond to the touch of the object.

17. The method of claim 16, further comprising:
starting a user setup mode corresponding to the plane coordinate information of the object.

18. A digital photographing apparatus comprising:
a 3D touch panel configured to determine plane coordinate information and depth information of an object;
a subject area setting unit configured to designate a subject area corresponding to the plane coordinate information of the object in an image input to the digital photographing apparatus;
a pre-processing control unit configured to perform a photographing preparation operation with respect to a first image of the subject area according to the depth information of the object; and
a photographing signal control unit configured to capture a second image of the subject area in relation to which the photographing preparation operation is performed.

19. The digital photographing apparatus of claim 18, wherein the photographing preparation operation is at least one selected from the group consisting of auto-focusing (AF), auto-exposure (AE), and auto-white balance (AWB).

20. The digital photographing apparatus of claim 18, wherein the 3D touch panel is configured to sense a touch of the object, and wherein the photographing signal control unit is configured to capture, after sensing the touch of the object, the second image of the subject area in relation to which the photographing preparation operation is performed.

21. The digital photographing apparatus of claim 18, wherein the photographing signal control unit is further configured to capture, when the 3D touch panel has sensed a touch of the object while the photographing preparation operation is being performed, the second image of the subject area after completing the photographing preparation operation.

22. The digital photographing apparatus of claim 18, further comprising a pre-processing setup locking/unlocking unit configured to lock or unlock a setup of the digital photographing apparatus according to a result of the photographing preparation operation that is completed according to depth information of the object during a period from when the photographing preparation operation is completed to when a touch of the object is sensed.

23. The digital photographing apparatus of claim 22, wherein the subject area setting unit is configured to designate, when the setup of the digital photographing apparatus is unlocked, a subject area corresponding to plane coordinate information of the object again in an image input to the digital photographing apparatus.

24. The digital photographing apparatus of claim 18, wherein depth information of the object corresponds to a relative distance between the object and the 3D touch panel based on depth information of the object determined when the subject area is designated.

25. A digital photographing apparatus comprising:
a 3D touch panel that has a display and an optical sensor that determines whether an object has touched or approached the 3D touch panel and is configured to determine plane coordinate information of the object and depth information of the object based on information determined by the optical sensor;
a first operation performing unit configured to perform a first operation corresponding to the plane coordinate information of the object and to set, according to the plane coordination information, a zooming mode in a live-view mode, or a zooming area in a playback mode; and
a second operation performing unit configured to perform a second operation according to the depth information of the object and to set, in a live-view mode or in a playback mode, a zooming magnification according to the depth information of the object.

26. The digital photographing apparatus of claim 25, wherein the depth information of the object corresponds to a relative distance between the object and the 3D touch panel based on the depth information determined when the plane coordinate information of the object is determined.

27. The digital photographing apparatus of claim 25, wherein the 3D touch panel comprises a display unit displaying a user interface that displays depth information of the object.

28. The digital photographing apparatus of claim 25, further comprising a third operation performing unit configured to perform a third operation corresponding to the sensed touch of the object, if the 3D touch panel senses a touch of the object.

29. The digital photographing apparatus of claim 25, wherein the first operation performing unit is configured to start the zooming mode corresponding to the plane coordinate information of the object in the live-view mode, and the second operation performing unit is configured to set the zooming magnification according to the depth information of the object.

30. The digital photographing apparatus of claim 25, wherein the first operation performing unit is configured to select the zooming area corresponding to the plane coordinate information of the object in the playback mode, and the second operation performing unit is configured to set the zooming magnification with respect to the zooming area according to the depth information of the object.

31. The digital photographing apparatus of claim 28, wherein the first operation performing unit is configured to start the zooming mode corresponding to the plane coordinate information of the object in the live-view mode, and the second operation performing unit is configured to set the zooming magnification with respect to the zooming area according to the depth information of the object determined when the zooming mode is started, and the third operation performing unit is configured to pick up an image that is input according to the set zooming magnification that is set to correspond to the sensed touch of the object.

32. A digital photographing apparatus comprising:
   a 3D touch panel that has a display and an optical sensor that determines whether an object has touched or approached the 3D touch panel and is configured to determine depth information of an object and to sense a touch of the object and to determine plane coordinate information of the object;
   a first operation performing unit configured to perform a first operation corresponding to the depth information of the object and to set, in a live-view mode or in a playback mode, a zooming magnification according to the depth information of the object; and
   a second operation performing unit configured to perform a second operation corresponding to the sensed touch of the object and to set, according to the plane coordination information, a zooming mode in a live-view mode, or a zooming area in a playback mode.

33. The digital photographing apparatus of claim 32, wherein the first operation performing unit is configured to select a menu to be set from among a plurality of menus according to the depth information of the object determined when a user setup mode is started, and the second operation performing unit is configured to set an item corresponding to a touching position of the object from among a plurality of items included in the menu that is selected to correspond to the touch of the object.

34. The digital photographing apparatus of claim 32, further comprising:
   a third operation performing unit configured to start a user setup mode corresponding to the plane coordinate information of the object.

* * * * *